(No Model.) 2 Sheets—Sheet 1.
C. O. L. CARDELL & O. P. OSTERGREN.
BICYCLE.
No. 596,960. Patented Jan. 4, 1898.
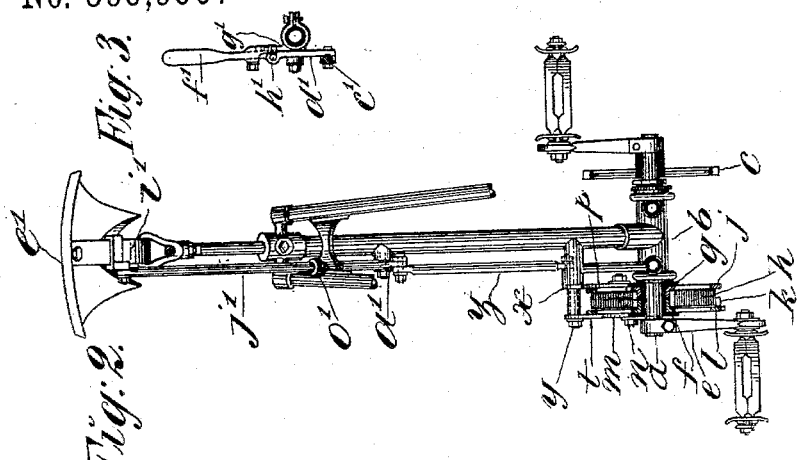
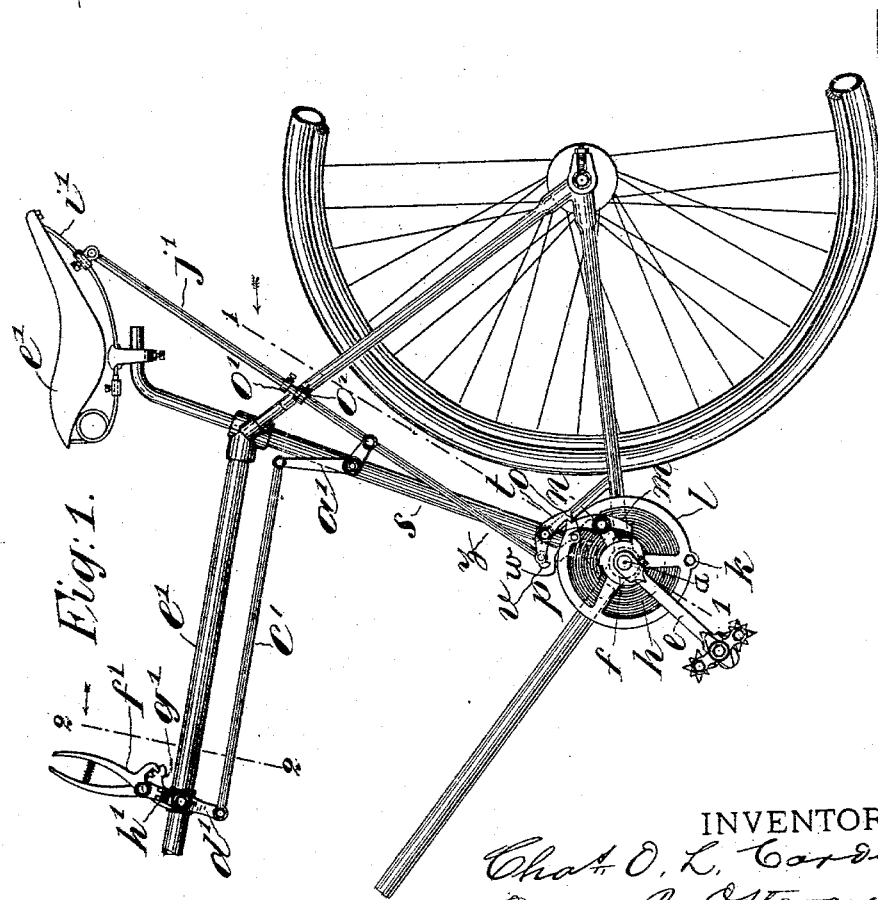
WITNESSES:
INVENTORS,
Chas. O. L. Cardell
Oscar P. Ostergren
By A. P. Thayer
Attorney.

(No Model.) 2 Sheets—Sheet 2.

C. O. L. CARDELL & O. P. OSTERGREN.
BICYCLE.

No. 596,960. Patented Jan. 4, 1898.

WITNESSES:
J. W. Kliman
O. J. Morgan

INVENTORS
Chas. O. L. Cardell
Oscar P. Ostergren
By A. P. Thayer, Attorney.

UNITED STATES PATENT OFFICE.

CHARLES O. L. CARDELL, OF PEARL RIVER, AND OSCAR P. OSTERGREN, OF NEW YORK, N. Y.

BICYCLE.

SPECIFICATION forming part of Letters Patent No. 596,960, dated January 4, 1898.

Application filed October 22, 1896. Serial No. 609,640. (No model.)

*To all whom it may concern:*

Be it known that we, CHARLES O. L. CARDELL, a citizen of the United States, residing at Pearl River, and OSCAR P. OSTERGREN, a subject of the King of Sweden and Norway, residing at New York city, New York, have invented new and useful Improvements in Bicycles, of which the following is a specification.

Our invention consists of an improved bicycle attachment for storing energy when in excess of what is required, as in descending grades, and applying it again when resistance is excessive, as in ascending grades, as hereinafter described, reference being made to the accompanying drawings, in which—

Figure 5:
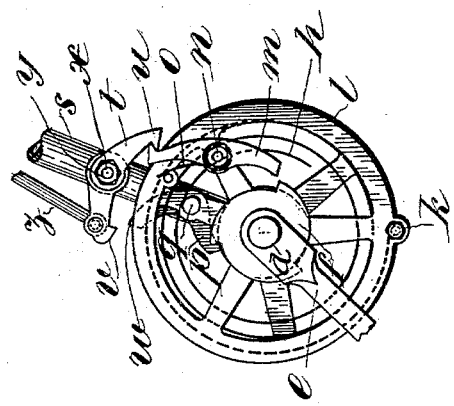
Figure 4:
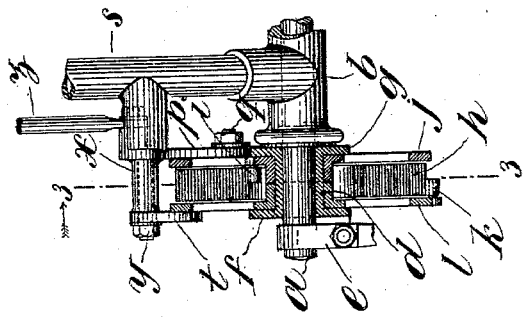
Figure 6:
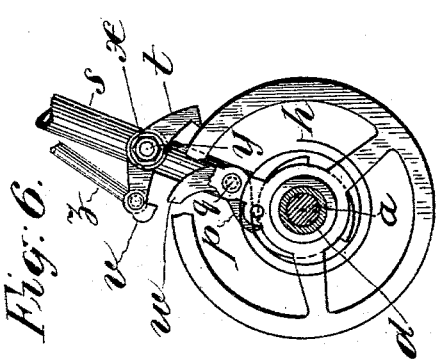

Figure 1 is a side elevation of part of a bicycle having our improved attachment. Fig. 2 is a transverse sectional elevation of the parts represented in Fig. 1 on line 1 1. Fig. 3 is a detail in transverse section of part of Fig. 1 on line 2 2. Fig. 4 is a detail in section on line 1 1 of Fig. 1 on a larger scale for greater clearness. Fig. 5 is a side elevation of the parts represented in Fig. 4, enlarged; and Fig. 6 is a side elevation of part of the devices represented in Fig. 4, the rest cut off on line 3 3, Fig. 4, also enlarged.

On the crank-axle $a$ and preferably at the side of the axle-box $b$ opposite to the sprocket-wheel $c$ we apply a sleeve $d$, at each end of which is a flange notched or toothed on the edge for the engagement of a pawl therewith, said sleeve being intermediate of the crank $e$ and the end of axle-box $b$ and being keyed or otherwise firmly secured to the axle, so as to turn with it. The outer flange $f$ has its teeth so cut that a pawl engaged therewith will be carried around with the crank-shaft when turning in the direction for driving the machine, and the inner flange $g$ has its teeth cut reversely, whereby a pawl engaging them and being impelled in the forward direction will tend to drive the crank-shaft forward. On this sleeve $d$ and between its flanges are two disks fitted to turn freely and independently of each other and forming a case for a flat coiled spring $h$, which is duly fitted therein in the manner of a clock-spring, with its inner end connected at $i$ to the hub of the inner disk $j$ and its outer end connected at $k$ to the outer disk $l$. On the outer disk $l$ is a pawl $m$, pivoted to said disk at $n$ and provided with a spring $o$, tending to keep it in engagement with a tooth of flange $f$, and on the inner disk is a pawl $p$, pivoted to said disk at $q$ suitably for engagement with a tooth of flange $g$, and will in practice have a like spring, as $o$, to keep it in such engagement.

On the frame-post $s$ above the disks is a hook-pawl $t$ for engagement with a hook-head $u$ of pawl $m$ to hold it out of engagement with flange $f$, and another hook-pawl $v$ for engagement with end $w$ of pawl $p$ to hold it out of engagement with flange $g$, these two pawls being extended in opposite directions from a center hub $x$, common to both and fitted on the pivot-stud $y$, whereon they turn together, but in reverse directions.

A rod $z$ is connected to pawl $v$ and to the bell-crank $a'$, pivoted on post $s$ a suitable distance above the pawls, and the bell-crank is connected by another rod $c'$ with the hand-lever $d'$, mounted on the upper frame-bar $e'$ at a suitable distance forward of the saddle for being actuated by the rider to actuate the pawls $t$ $v$. A latch $f'$ and notched bar $g'$ are provided for securing the lever in different positions, and the lever has a joint at $h'$ to facilitate engaging and disengaging the latch with the notched bar $g'$ by swinging the part of the lever carrying the latch laterally to said notched bar. $o'$ represents stops to limit the movements of pawls $t$ $v$. The bell-crank $a'$ is also connected with the seat-spring $i'$ by a rod $j'$ to actuate the pawls $t$ $v$ thereby in lieu of the hand-lever $d'$, when preferred, the operation being as follows: When going down hill and the rider rests his whole weight on the saddle and thereby depresses the hinder part, pawl $t$ will be raised and will release pawl $m$, which will then engage flange $f$, by which disk $l$ will be turned through the action of the crank-shaft, and the spring $h$ will be wound up, disk $j$ being then held stationary by pawl $v$ engaging the end $w$ of pawl $p$, which, being pivoted on disk $j$, prevents its rotation during the winding of the spring.

When going uphill and the saddle is largely relieved of the rider's weight through greater application of weight on the pedals and rises in the hinder part, the saddle-spring $i'$ will raise rod $z$ and swing pawl $t$ down and engage its hook end with the hook end of pawl $m$, disengaging the latter from flange $f$ and holding disk $l$ stationary, while pawl $p$, being freed from pawl $v$, will engage flange $g$, so that the pull of the spring $h$ on the disk $j$ will be expended in impelling effect on the crank-shaft.

When the saddle and lever $d'$ are in the middle positions, both pawls $m$ and $p$ will be disconnected from the flanges, the spring will unwind, and the attachment will be inactive.

The manner of controlling the attachment by the hand-lever $d'$ instead of the saddle is obvious.

When in winding up the spring the limit is reached, excessive thrust will be produced on the end of pawl $m$ by notched disk $f$ forcing the pawl out of the notch, spring $o$ being overpowered, which through the shock it produces will make known to the rider that the spring is wound up, when he will make the necessary shift to utilize the power of the spring if then wanted, or allow it to run slack again if not yet required.

We claim as our invention—

1. In a bicycle the combination with the crank-axle, the driving sprocket-wheel thereon, and the usual driving-cranks, of the auxiliary crank-axle-driving spring, said spring being coiled around the axis of the crank-axle, means for coupling the spring at one end with the bicycle-frame, and coupling it at the other end with the crank-axle for automatically winding up the spring by the power of the moving machine independently of the cranks, and means for reversing these connections to utilize the stored energy of the spring for impelling the crank-axle in addition to the foot-power on the pedals, acting directly on the sprocket-wheel substantially as described.

2. In a bicycle the combination with the crank-axle, of the spring, and means controlled by the saddle subject to the pressure of the rider thereon for coupling the spring at one end with the bicycle-frame, and coupling it at the other end with the crank-axle for winding up the spring by the crank-axle substantially as described.

3. In a bicycle the combination with the crank-axle of the flanged sleeve secured thereto, the independently-movable disks thereon, a spring arranged intermediately of the disks and secured at one end to the hub of one disk and at the other end to the outer portion of the other disk, pawls pivoted on the disks for engaging the sleeve reversely, the duplex pawl controlling the sleeve-engaging pawls for engaging one and disengaging the other respectively, and means for actuating said duplex pawl substantially as described.

4. In a bicycle the combination with the crank-axle, of the flanged sleeve secured thereto, the independently-movable disks thereon, spring arranged intermediately of the disks and secured at one end to the hub of one disk and at the other end to the outer portion of the other disk, pawls pivoted on the disks for engaging the sleeve reversely, the duplex pawl controlling the sleeve-engaging pawls for engaging one and disengaging the other respectively, and means controlled by the saddle subject to the pressure of the rider thereon for actuating said duplex pawl substantially as described.

In testimony that we claim the foregoing as our invention we have signed our names, in presence of two witnesses, this 25th day of September, 1896.

CHARLES O. L. CARDELL.
  OSCAR P. OSTERGREN.

Witnesses:
 W. J. MORGAN,
 A. P. THAYER.